(12) United States Patent
Brun et al.

(10) Patent No.: US 11,342,083 B2
(45) Date of Patent: May 24, 2022

(54) INTEGRATED NUCLEAR REACTOR ARCHITECTURE LIMITING THE STRESS APPLIED TO THE INTEGRATED MECHANISMS

(71) Applicant: Société Technique pour l'Energie Atomique, Villiers le Bacle (FR)

(72) Inventors: Michel Brun, Simiane-Collongue (FR); Charles Dumanois, Rians (FR)

(73) Assignee: SOCIÉTÉ TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 0 days.

(21) Appl. No.: 16/966,643

(22) PCT Filed: Feb. 8, 2019

(86) PCT No.: PCT/EP2019/053139
§ 371 (c)(1),
(2) Date: Jul. 31, 2020

(87) PCT Pub. No.: WO2019/154988
PCT Pub. Date: Aug. 15, 2019

(65) Prior Publication Data
US 2020/0357529 A1    Nov. 12, 2020

(30) Foreign Application Priority Data

Feb. 9, 2018 (FR) .................... 18 51115

(51) Int. Cl.
*G21C 7/14* (2006.01)
*G21C 1/32* (2006.01)
*G21C 15/06* (2006.01)

(52) U.S. Cl.
CPC ............. *G21C 7/14* (2013.01); *G21C 1/326* (2013.01); *G21C 15/06* (2013.01)

(58) Field of Classification Search
CPC .......... G21C 1/326; G21C 7/18; G21C 15/02; G21C 7/14
(Continued)

(56) References Cited

U.S. PATENT DOCUMENTS 3,231,474 A * 1/1966 Challender ............ G21C 1/322
376/375
4,173,511 A * 11/1979 Dietrich .................... G21C 7/12
376/230
(Continued)

FOREIGN PATENT DOCUMENTS

| CN | 106887261 | 6/2017 | |
|---|---|---|---|
| FR | 3039695 A1 | 2/2017 | |
| WO | WO-2017017242 A1 * | 2/2017 | ............... G21C 7/14 |

OTHER PUBLICATIONS

Kusunoki, T., et al. "Design of advanced integral-type marine reactor, MRX." Nuclear engineering and design 201.2-3 (2000): 155-175. (Year: 2000).*
(Continued)

*Primary Examiner* — Jack W Keith
*Assistant Examiner* — Jinney Kil
(74) *Attorney, Agent, or Firm* — Davidson, Davidson & Kappel, LLC

(57) ABSTRACT

A nuclear reactor (10) includes a vessel (12) containing a primary liquid, a core (14) comprising nuclear fuel and arranged in the internal volume of the vessel (12), at least one primary pump generating a main primary flow (56) of primary liquid in the vessel (12), at least one control member (16) for controlling the reactivity of the core (14), at least one movement mechanism (18) for moving the control member (16), arranged in the internal volume of the vessel (12) and linked to the control member (16), and a pressurizer (20) situated in a top portion of the vessel (12). The movement mechanism (18) comprises an electrical actuator
(Continued)

and a transmission mechanism. The electrical actuator is completely immersed in the primary fluid and situated outside the main primary flow (56).

20 Claims, 2 Drawing Sheets

(58) Field of Classification Search
USPC .................................. 376/210, 219, 228, 406
See application file for complete search history.

(56) References Cited

U.S. PATENT DOCUMENTS

| | | | | |
|---|---|---|---|---|
| 5,053,190 | A * | 10/1991 | Gardner | G21C 15/18 376/366 |
| 2005/0018806 | A1 * | 1/2005 | Gautier | G21C 1/32 376/406 |
| 2011/0222640 | A1 * | 9/2011 | DeSantis | G21C 7/14 376/229 |
| 2012/0263270 | A1 | 10/2012 | Malloy et al. | |
| 2015/0187446 | A1 * | 7/2015 | Young | G21C 7/14 376/224 |
| 2015/0221399 | A1 * | 8/2015 | Jung | G21C 7/12 376/219 |
| 2015/0243377 | A1 | 8/2015 | Malloy et al. | |
| 2015/0371724 | A1 * | 12/2015 | Candillier | G21C 1/32 376/205 |
| 2018/0019027 | A1 * | 1/2018 | Morgan | H02K 9/19 |
| 2018/0226161 | A1 | 8/2018 | Ranc et al. | |

OTHER PUBLICATIONS

NuScale, "NuScale Plant Design Overview." NP-ER-0000-1198 (2012) (Year: 2012).*
Ishida, Toshihisa, et al. "Development of in-vessel type control rod drive mechanism for marine reactor." Journal of nuclear science and technology 38.7 (2001): 557-570. (Year: 2001).*
Corresponding Search report for PCT/EP2019/053139.

* cited by examiner

INTEGRATED NUCLEAR REACTOR ARCHITECTURE LIMITING THE STRESS APPLIED TO THE INTEGRATED MECHANISMS

The present disclosure relates to a nuclear reactor comprising:
- a vessel having a central axis, containing a primary liquid,
- a core comprising nuclear fuel, the core being arranged in the internal volume of the vessel,
- at least one primary pump generating a main primary flow of primary liquid in the vessel, the main primary flow passing through the core, rising in a direction parallel to the central axis in a rising part of the main primary flow and descending through at least one vapor generator located on the periphery in the vessel in a descending part of the main primary flow,
- at least one control member for controlling the reactivity of the core, the control member extending in a respective direction parallel to the central axis and being aligned with the core in said respective direction,
- at least one movement mechanism for moving the control member, arranged in the internal volume of the vessel and linked to the control member,
- a pressurizer situated in a top portion of the vessel along the central axis, the pressurizer being in communication with the primary fluid, the movement mechanism comprising an electric actuator and a transmission mechanism.

BACKGROUND

Documents FR 3,039,695 and US 2015/0243377 A1 describe a nuclear reactor comprising a plurality of movement mechanisms for moving core reactivity control members. These mechanisms are housed entirely in the vessel. This in particular makes it possible to reduce the overall height of the nuclear reactor.

Each movement mechanism in particular comprises a motor completely submerged in the primary liquid inside the vessel.

In this type of reactor, all of the submerged mechanisms are typically positioned in the main primary flow.

However, the primary liquid of the main primary flow passes through the core before interacting with certain submerged mechanisms, including the movement mechanisms of the control members.

On the one hand, the primary flow has a very significant flow in order to cool the core. The movement mechanisms have mechanical play, in particular to allow the movement of the control members, such that a liquid with a very significant flow can damage the structure of the movement mechanisms.

On the other hand, the products of the fission coming from the core can interact with the mechanism by irradiation. In particular, the motor is, for example, an electromotor including a non-negligible mass of metals able to be activated by irradiation, such as cobalt.

SUMMARY

One aim of the present disclosure is therefore to provide a nuclear reactor having a reduced size and in which the interactions between the core and the submerged mechanisms are reduced.

To that end, the subject matter of the present disclosure includes a nuclear reactor of the aforementioned type, in which the electric actuator is completely immersed in the primary fluid, and in that the electric actuator is situated outside the main primary flow.

The nuclear reactor can also have one or more of the features below, considered individually or according to any technically possible combinations:
- the main primary flow has a reversal zone between the rising part and the descending part, the circulation of the fluid forming a turn back in the reversal zone, the electric actuator being located above the reversal zone in the direction of the central axis and below the pressurizer in a direction parallel to the central axis,
- it comprises a cooling line of the electric actuator, the cooling line withdrawing primary liquid from the main primary flow leaving the core or at a discharge from the primary pump, the travel time between the withdrawal of the primary liquid from the main primary flow and the passage of the primary liquid by the motor being greater than a minimum duration,
- the minimum duration is greater than 50 seconds, preferably between 50 seconds and 150 seconds,
- the electric actuator comprises:
- a motor comprising a stator and a rotor able to apply a rotary torque, and
- a system for releasing the control member able to release the control member into the core by gravitational drop; and
- the transmission mechanism comprises:
- a driving device comprising a movement part, the movement part being linked to the motor such that the rotary torque of the motor is applied to the movement part,
- a driven member comprising one of a screw or a nut, the driven member being driven in rotation by the movement part,
- a transmission member forming the other of the screw or the nut secured to the control member,
- the screw and the nut cooperating such that a rotation of the movement part of the driving device relative to the stator results in a translation of the control member parallel to the central axis,
- the transmission member bears the nut, the driven member comprising the screw, the nut cooperating with the screw on the outer diameter of said screw,
- the driven member has an orifice extending along the respective direction at least in an upper part of the driven member over a length greater than a maximum movement of the control member, the movement part of the driving device having a polygonal section extending at least partially in said orifice over the length of the orifice, the orifice having a corresponding polygonal section at least in an upper part, the driven member and the movement part being secured in rotation,
- the driven member has, in an upper part, at least one through hole connecting the orifice to the outside of the driven member,
- the release of the control member is obtained by releasing the driven member,
- the driven member comprises a shoulder, the release system comprising at least one element movable between a holding position and a release position, the movable element extending below the shoulder in the respective direction in the holding position and not extending below the shoulder in the respective direction in the release position.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
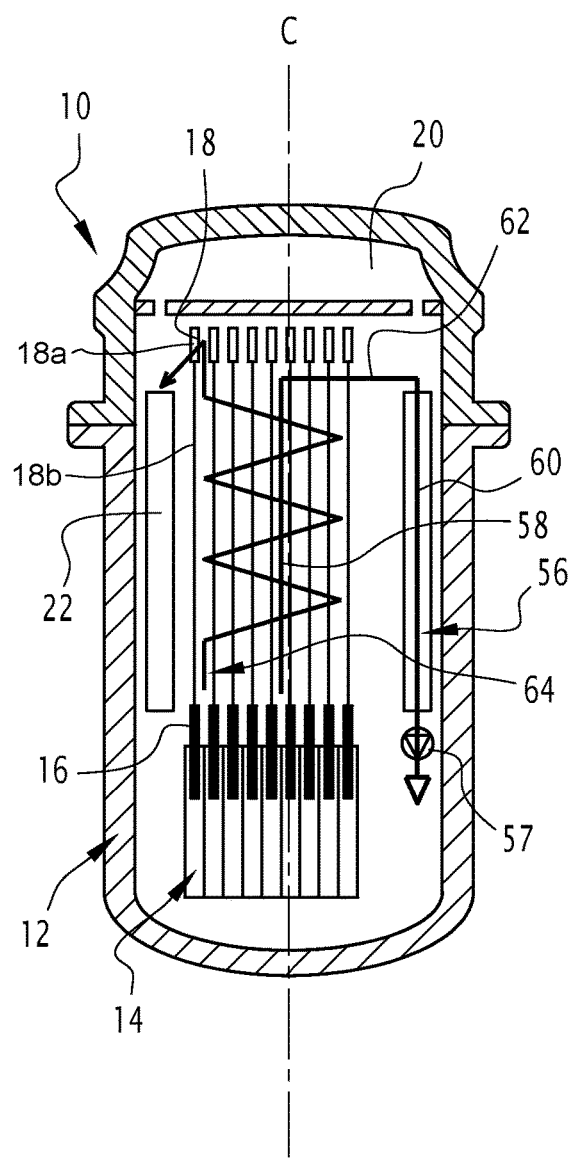
FIG. 1 is a schematic sectional illustration of one embodiment of a nuclear reactor according to the invention.

The nuclear reactor 10 shown in FIG. 1 is a reactor of the SMR (Small and Medium Reactor) type. This type of reactor for example equips small nuclear facilities, with a power of several hundred electric megawatts (MWe). This reactor is typically of the pressurized water reactor (PWR) type. In a variant, the reactor is of the boiling water reactor (BWR) type.

The reactor 10 comprises a vessel 12 having a central axis C, a plurality of nuclear fuel assemblies forming a core 14 arranged in the inner volume of the vessel 12, at least one control member 16 controlling the reactivity of the core 14, and at least one movement mechanism 18 for moving the control member. More particularly, the reactor 10 comprises a plurality of control members 16 and one movement mechanism 18 per control member 16.

In FIG. 1, only a small number of nuclear fuel assemblies, control members and movement mechanisms have been shown. In reality, each nuclear reactor includes a large number of nuclear fuel assemblies, and even a large number of control members and movement mechanisms.

The central axis C is typically vertical or substantially vertical. The vessel 12 is substantially of revolution around the central axis C.

In the present description, the terms lower and upper, high and low, above and below, are to be understood relative to a vertical direction, substantially corresponding to the central axis C.

The vessel 12 contains the primary liquid of the nuclear reactor.

The reactor 10 further comprises a pressurizer 20 situated in a top portion of the vessel 12 along the central axis C, the pressurizer 20 being in communication with the primary fluid in order to keep the primary fluid at a given pressure.

More specifically, the pressurizer 20 extends over the entire top part of the vessel 12 from a certain height.

The reactor 10 further comprises one or several vapor generators 22 housed in the internal volume of the vessel 12 and extending around the control members 16 and movement mechanisms 18. The vapor generator(s) 22 has/have a cylindrical symmetry about the central axis C.

The nuclear fuel assemblies are elongated elements parallel to the central axis C, with a prismatic shape, placed against one another.

The control members 16 for controlling the reactivity of the core are known as control clusters or control bars. Each one includes a part made up of a neutron-absorbing material or neutron absorber. Each control member has an elongated shape parallel to the central axis C, and with a section suitable for allowing the insertion of the control member into a channel, not shown, arranged in the nuclear fuel assembly.

Each control member is aligned with the core in a direction parallel to the central axis C.

The movement mechanisms 18 are arranged in the internal volume of the vessel. Each movement mechanism 18 is typically linked to one or several control members 16.

The movement mechanisms 18 are also called CRDM (Control Rod Drive Mechanism).

Each movement mechanism 18 is provided to move one of the control members 16 along an axis A parallel to the central axis C, so as to completely remove it from the corresponding nuclear fuel assembly, or to insert it over a determined length inside the nuclear fuel assembly.

Figure 2:
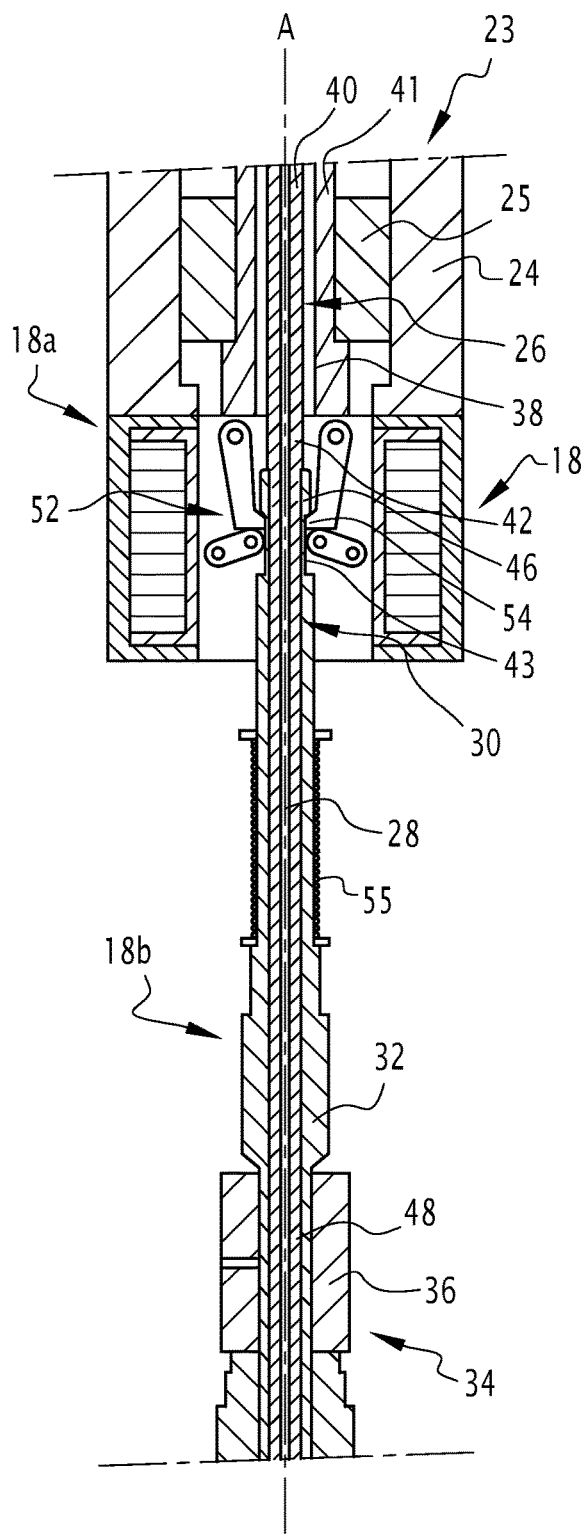
FIG. 2 is a schematic sectional illustration of a movement mechanism of a control member of the nuclear reactor of FIG. 1, in the armed position.

As shown in FIG. 2, each movement mechanism 18 comprises an electric actuator 18a and a transmission mechanism 18b.

The electric actuator 18a comprises a motor 23 comprising a stator 24 and a rotor 25 that may be rotated.

The transmission mechanism 18b comprises:

a driving device 26 comprising a movement part 28, the driving device 26 being linked to the motor 23 such that the rotary torque of the rotor 25 is applied to the movement part 28, a driven member 30 comprising one 32 of a screw or a nut, a transmission member 34 forming the other 36 of the screw or the nut.

The electric actuator 18a is located below the pressurizer 20 along a direction parallel to the central axis C.

The electric actuator 18a is completely immersed in the primary liquid inside the vessel. More generally, the movement mechanisms 18 are completely immersed in the primary liquid inside the vessel 12. None of the elements of the movement mechanisms 18 protrude outside the vessel 12. More particularly, the motor 23, the driving device 26, the driven member 30 and the transmission member 34 are immersed in the primary liquid inside the vessel 12. Typically, all of these elements are continuously immersed in the primary liquid.

Only electrical conductors connecting the movement mechanism to a power source or to electronic detection members leave the vessel.

Thus, the reactor 10 has a reduced total height.

The stator 24 has a cylindrical general shape about the axis A parallel to the central axis C.

The rotor 25 is positioned inside the stator 24 and has a cylindrical general shape coaxial to the axis A. It has a central passage 38, extending along the axis A.

The driving device 26, aside from the movement part 28, comprises a connecting part 40 engaged in the central passage 38, such that the rotor 25 and the connecting part 40 are secured in rotation, for example, using a connecting part 41 extending between the rotor 25 and the connecting part 40.

The driving member 26 comprises a rod 42 extending parallel to the central axis C along the axis A. The movement part 28 makes up the lower segment of said rod and the connecting part 40 of the top segment of said rod. The movement part 28 is secured to the connecting part 40.

The rod 42 is large along the axis A.

The rod 42 extends downward along the axis A past the motor 23.

In the illustrated example, the movement part 28 has a polygonal section, more specifically a square section, the section being considered perpendicular to the axis C.

The driven member 30 extends around the axis A. Here, the driven member 30 has a tubular overall shape.

In a top part 43, the driven member 30 for example has a cylindrical outer shape with a polygonal section, more specifically square. Outside the top part, the driven member 30 for example has a cylindrical outer shape with a circular section.

Figure 3:
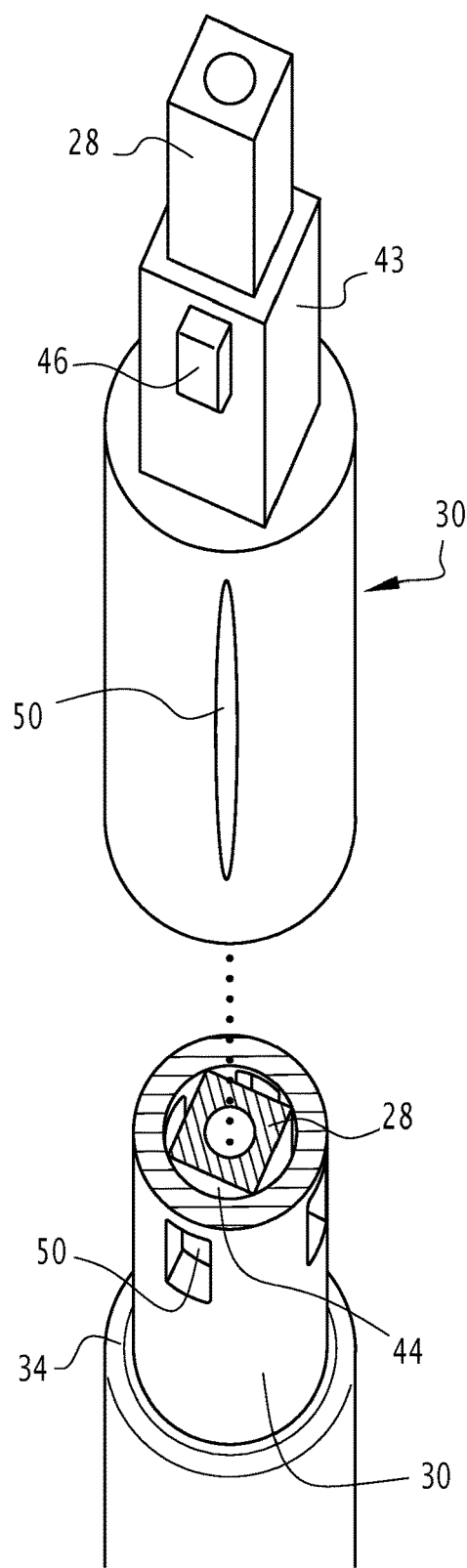
FIG. 3 is a perspective and sectional view of the upper part and the lower part of the driven member of the movement mechanism of FIG. 2.

The driven member 30 has an orifice 44 visible in FIG. 3 extending along the axis A at least in a top part of the driven member over a length greater than a maximal movement of the control member 16, more specifically here over the entire height along the axis A of said driven member 30.

In a top part of the orifice 44, the orifice 44 has a polygonal section corresponding to the polygonal section of the movement part 28. The top part of the orifice 44 is, for example, defined in the top part 43 of the driven member 30, such that at this level, the driven member forms a polyhedral ring. In a bottom part of the orifice 44, the orifice 44 has a circular section. The polygonal section of the movement part 28 is comprised in said circular section.

The movement part 28 extends in the orifice 44.

The driven member 30 cooperates with the movement part 28 at the top part of the orifice 44, such that a rotation is transmitted between the movement part 28 and the driven member 30. Thus, a rotation of the motor 25 is transmitted to the driven member 30 by the driving device 26.

The driven member 30 also has a shoulder 46 on its outer surface, more specifically in its top part.

The driven member 30 further has a thread 48 on its outer surface, more specifically in a bottom part. Thus, the driven member here comprises the screw.

The driven member 30 further has at least one through hole 50 connecting the orifice 44 to the outer surface of the screw, more specifically above the thread 48. The through hole 50 in particular allows a liquid extending in the orifice 44 to be discharged from inside the driven member 30, during rapid movements of the driven member 30 in the orifice 44.

On the one hand, the transmission member 34 is connected to the control member 16. More specifically, the transmission member 34 is secured in translation along the axis A with the control member 16.

On the other hand, the transmission member 34 cooperates with the driven member 30.

The transmission member 34 here bears the nut.

The nut cooperates with the driven member 30 at the thread 48.

In general, the screw and the nut cooperate such that a rotation of the driven member 30 relative to the vessel 12 results in a translation of the transmission member 34 along the axis A. Thus, a rotation of the movement part 28 of the driving device 26 relative to the stator 24 results in a translation of the control member 16 parallel to the central axis C.

More specifically, the transmission member 34 is blocked in rotation about the axis A, such that a rotation of the driven member 30 about the axis A causes a translation of the transmission member 34 along the axis A by movement of the nut on the thread 48.

The movement mechanism for example comprises a sheath surrounding the transmission member 34 and having a groove along the axis A, able to cooperate with a corresponding rib present in the transmission member 34.

Thus, the cooperation between the groove and the rib prevents the rotation of the transmission member 34, but allows a translation along the axis A, by movement of the rib in the groove.

Alternatively, the transmission member 34 has a groove along the axis A and the sheath has the corresponding rib.

A rotation of the driven member 30 in a first direction causes a lowering of the transmission member along the axis A, while a rotation of the driven member 30 in a second direction opposite the first direction causes a rising of the transmission member along the axis A. More specifically, a rotation of the rotor 25 in the first direction causes a lowering of the control member 16, while a rotation of the rotor in the second direction causes a rising of the control member 16.

Thus, by rotational movement of the rotor 25, it is possible to control the pushing of the control member 16 into the nuclear fuel assembly, so as to control the reactivity of the core 14.

The use of a nut cooperating with the outer surface of the driven member in particular makes it possible to use satellite rolls and/or rollers in order to limit the friction of the nut during the translation.

The electric actuator 18b of the movement mechanism 18 further comprises a release system 52 of the control member 16 able to release the control member 16 into the core 14 by gravitational drop.

The release system 52 makes it possible to transition the movement mechanism 18 from an armed position, in which the height of the control member 16 pushed into the core 14 is controlled by rotation of the motor 23, to a released position, in which the control member 16 is pushed into the core 14 according to a maximum height.

The release of the control member 16 here is obtained by releasing the driven member 30, here causing the drop by gravity of the transmission member 34 and thus of the control member 16.

The release here is controlled by a coil, the coil being powered so as to keep the movement mechanism in the armed position during normal operation of the reactor. In case of problem, cutting off the power of the coil causes the gravitational release and the transition from the armed position to the released position.

Figure 4:
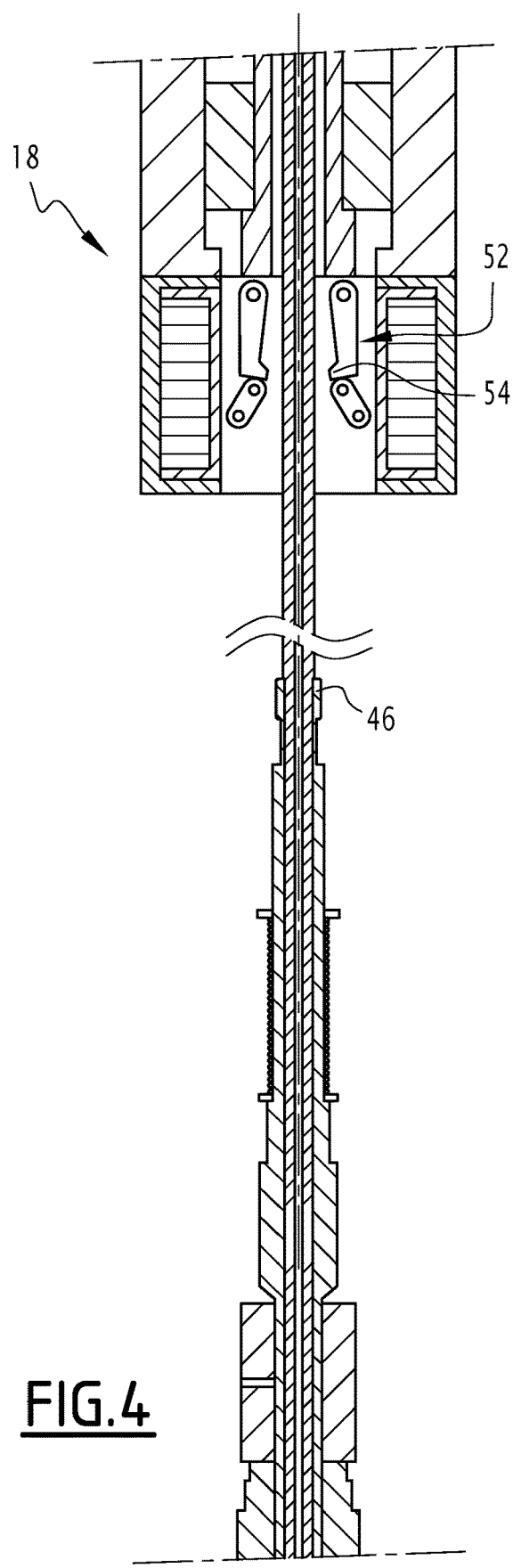
FIG. 4 is a schematic sectional illustration of the movement mechanism of FIG. 2, in the released position.

More specifically, the release system 52 comprises at least one element 54 movable between a holding position and a release position. The movable element 54 is held by the coil. In the holding position, the movable element 54 extends below the shoulder along the axis A such that the shoulder 46 bears on said movable element 54 and the driven member 30 is held by the release system 52. In the release position, the movable element 54 no longer extends below the shoulder along the central axis so as to release the driven member 30, which is driven by gravitational drop along the axis A, as shown in FIG. 4.

The movable element 54 is, for example, one or several pawls.

During the release, liquid may be contained in the driven member 30, the hole(s) 50 then allowing a rapid discharge of the liquid.

In addition, a pulse spring 55 accelerates the drop in the first instants.

The drop time is particularly short. Indeed, because the screw-nut connection is released with the driving member, the drop corresponds to a simple translational movement and not to the helical movement of a screw or nut.

The mechanical friction is reduced.

The polyhedral shape of the movement part 28 in the cylindrical bottom part of the orifice 44 of the driven member 30 is particularly advantageous because it limits the mechanical and/or hydraulic friction between the driven member 30 and the driving member 26 during the gravitational drop of the driven member 30, which makes it possible to reduce the drop time during the release.

Furthermore, the arrangement of the driven member 30 around the driving member 26 is such that the driven member 30 is held around the driving member 26 after the release, in particular owing to the length of the driving member 26. More specifically, the rod 42 extends far toward the bottom along the axis A such that the rod 42 remains engaged in the top part of the driven member when the control member 16 is in the released position.

It is then easy to recover the driven member 30, as well as the assembly borne by the driven member 30, to raise it around the driving member 26, so as to return the movement mechanism 18 to the armed position. For example, the raising of the driven member 30 is done by rotation of the screw, which then rises by cooperation with the nut. Once the driving member 32 is raised to the high position, the movable element 54 is then moved to the holding position, which makes it possible to return to the situation before release.

Furthermore, the vessel has a main primary flow 56 of primary liquid, visible in FIG. 1.

The main primary flow 56 passes through the core 14, then rises along a direction parallel to the central axis C in a rising part 58 of the main primary flow 56, then descends through the vapor generator 22 in a descending part 60 of the main primary flow 56.

In the rising part 58 and in the descending part 60, the fluid moves substantially parallel to the axis C.

The rising part 58 for example corresponds to a part of the vessel partially comprising the driven member, the transmission member and/or the part of the control member not pushed into the nuclear fuel.

The main primary flow 56 has a reversal zone 62 between the rising part 58 and the descending part 60, the circulation of the fluid forming a turn back in the reversal zone 62.

In the reversal zone 62, the fluid moves substantially perpendicular to the central axis C so as to reach an inlet of the vapor generator 22.

Thus, the main primary flow 56 travels in this order: the rising part 58, the reversal zone 62, then the descending part 60.

The movement of the primary liquid in the main primary flow 56 here is driven by at least one primary pump 57 located at the descending part 60, for example, at the vapor generator inlet and/or outlet.

The electric actuator 18a is located outside the main primary flow 56. The main primary flow 56 does not pass through the electric actuator 18a in particular comprising the motor 23 of the movement mechanism 18.

More specifically, the electric actuator 18a is located above the reversal zone 62 in the direction parallel to the central axis C. Thus, the electric actuator 18a has a height defined along the axis A located between the reversal zone 62 and the pressurizer 20.

Thus, the electric actuator 18a does not interact directly with the fission products present in the main primary flow 56 at the core 14 outlet and does not experience the constraints related to the strong flow and/or the high speed of the main primary flow 56.

The nuclear reactor 10 comprises a cooling line 64 of the motor 23 of the drive mechanism 18. The cooling line withdraws primary liquid from the main primary flow 56 at the outlet of the core 14, as shown, or the discharge from the primary pump(s) 57.

The travel time between the withdrawal of the primary liquid from the main primary flow 56 and the passage of the primary liquid at the motor 23 is greater than a minimum duration.

In order for the primary liquid of the cooling line to reach the motor 23 after said minimum duration, the speed of the liquid is, for example, reduced relative to the speed in the main primary flow 56, in particular owing to the use of diaphragm(s).

The minimum duration is greater than 50 seconds, preferably between 50 seconds and 150 seconds.

The minimum duration in particular makes it possible for the radioactive elements produced by the core with a short lifetime to be primarily transformed into other elements, such that said elements with a short lifetime do not interact with the motor. Elements with a short lifetime for example refer to elements having a radioactive period of less than 10 seconds, for example isotope 17 of nitrogen ($^{17}N$), which has a radioactive period substantially equal to 4.2 s.

The presence of a cooling line different from the main primary flow 56 in particular makes it possible to have a lower flow and/or speed for the cooling of the movement mechanism relative to the flow and/or speed for the cooling of the core. This makes it possible to reduce the mechanical stresses due to the liquid flow and/or speed applied to the movement mechanism.

Typically, the flow required to cool all of the electric actuators is 10,000 times lower than the main primary flow 56 required to cool the core.

Alternatively, the cooling line is independent or corresponds to a withdrawal of the main primary fluid 56 before passing through the core 14.

The operation of the nuclear reactor will now be described.

A starting configuration is considered in which the control member 16 is pushed by an initial height into the core 14. The control member is armed and the movable element 54 is in the holding position.

To move the control member 16 for controlling the reactivity of the core 14 downward or upward, the motor 23 is activated such that the rotor 25 is rotated in one direction. The rotational movement of the rotor is transmitted to the movement part 28 of the driving device 26, then to the driven device 30.

Depending on the rotation direction of the rotor 23, this rotation will be converted into a translational movement of the transmission member either upward or downward, parallel to the central axis C.

Indeed, the screw 32 here is rotated, such that the nut 36 is translated along the screw. This causes a movement of the control member 16 in translation parallel to the central axis C.

If it is necessary to quickly lower the control members 16 for controlling the reactivity of the core 14 inside the nuclear fuel assemblies, for example in case of emergency, the release system 52 is activated such that the movable element 54 enters the release position. The driven member 30 is no longer kept by the movable element 54 below the shoulder 46, such that the driven member 30 drops, driving the transmission member 34 and the control member 16.

After the release, it is then possible to raise the driven member 30 to rearm the control member 16 for controlling the reactivity of the core 14.

Such a nuclear reactor has a reduced height due to the movement mechanisms in the vessel and makes it possible to limit the interactions between the main primary flow and the motor of the movement mechanism, in terms of fission products but also mechanical stresses applied by the primary fluid.

Such a movement mechanism has a reduced radial space requirement.

The architecture of the movement mechanism, in particular the telescoping arrangement of the driven member and the driving member, notably means that it is no longer necessary to provide an offset above the motor, unlike the mechanism described in FR 3,039,695, in which the driving member protrudes past the motor. No element of the movement mechanism disclosed herein is located at a height strictly greater than that of the motor along the axis A.

Such an architecture in particular makes it possible to use a motor of the disc type, that is to say, having a cylindrical shape with no central orifice, the motor extending above the rest of the movement mechanism. The diameter of the motor is for example substantially equal to that of the disc fitted in the pitch of the fuel assemblies. Such a motor generally has a height smaller than that of a motor as previously described. Thus, this makes it possible to further reduce the space requirement in terms of height of the movement mechanisms.

What is claimed is:

1. A nuclear reactor comprising:
   a vessel having a central axis and containing a primary liquid;
   a core comprising nuclear fuel, the core being arranged in an internal volume of the vessel;
   at least one primary pump generating a main primary flow of the primary liquid in the vessel, the main primary flow passing through the core, rising in a direction parallel to the central axis in a rising part of the main primary flow and descending through at least one vapor generator located on a periphery in the vessel in a descending part of the main primary flow, the main primary flow having a reversal zone between the rising part and the descending part, a circulation of the primary liquid forming a turn back in the reversal zone;
   at least one control member, the reactivity of the core being controlled by the at least one control member, the at least one control member extending in a respective direction parallel to the central axis and being aligned with the core in the respective direction parallel to the central axis;
   at least one movement mechanism configured for moving the at least one control member, the at least one movement mechanism being arranged in the internal volume of the vessel and linked to the at least one control member; and
   a pressurizer situated in a top portion of the vessel along the central axis, the pressurizer being in communication with the primary liquid,
   the movement mechanism comprising an electric actuator and a transmission mechanism,
   the electric actuator being completely immersed in the primary liquid, the electric actuator being situated outside the main primary flow, the electric actuator being located above the reversal zone in the direction of the central axis and below the pressurizer in a direction parallel to the central axis,
   the electric actuator comprising:
      a motor comprising a stator and a rotor configured to apply a rotary torque, and
      the control member being configured to be released into the core by gravitational drop by a release system;
   the transmission mechanism comprising:
      a driving device comprising a movement part, the movement part being linked to the motor such that the rotary torque of the motor is applied to the movement part,
      a driven member comprising one of a screw or a nut, the driven member being driven in rotation by the movement part, and
      a transmission member forming the other of the screw or the nut secured to the control member,
      the screw and the nut cooperating such that a rotation of the movement part of the driving device relative to the stator results in a translation of the control member parallel to the central axis,
      the driven member has an orifice extending along the respective direction parallel to the central axis at least in an upper part of the driven member over a length greater than a maximum movement of the control member, the movement part of the driving device having a polygonal section extending at least partially in the orifice over a length of the orifice, the orifice having a corresponding polygonal section at least in an upper part of the orifice, the driven member and the movement part cooperating such that when one of the driven member and the movement part rotates, the other of the driven member and the movement part rotates,
      the orifice being an internal orifice in the driven member.

2. The nuclear reactor according to claim 1, wherein the transmission member bears the nut, the driven member comprising the screw, the nut cooperating with the screw on the outer diameter of the screw.

3. The nuclear reactor according to claim 1, wherein the driven member has, in the upper part of the driven member, at least one through hole, the through hole connecting the orifice to an outside of the driven member.

4. The nuclear reactor according to claim 1, wherein releasing of the control member is obtained by releasing the driven member.

5. The nuclear reactor according to claim 4, wherein the driven member comprises a shoulder, the release system comprising at least one element movable between a holding position and a release position, the movable element extending below the shoulder in the respective direction parallel to the central axis in the holding position and not extending below the shoulder in the respective direction parallel to the central axis in the release position.

6. The nuclear reactor according to claim 1, further comprising a cooling line for cooling the electric actuator, the cooling line withdrawing the primary liquid from the main primary flow leaving the core or at a discharge from the primary pump, the cooling line further passing by the electrical actuator for cooling said electrical actuator, the withdrawn primary liquid travelling from the withdrawing from the main primary flow to the passing by the electric actuator in a travel time, the cooling line being configured such that the travel time is greater than a minimum duration.

7. The nuclear reactor according to claim 6, wherein the minimum duration is greater than 50 seconds.

8. The nuclear reactor according to claim 7, wherein the minimum duration is between 50 seconds and 150 seconds.

9. The nuclear reactor according to claim 1, wherein the movement part extends inside of the driven member longitudinally in the direction of the central axis.

10. The nuclear reactor according to claim 1, wherein the movement part contacts the inner surface of the driven member.

11. The nuclear reactor according to claim 1, wherein a portion of the driving device extends inside of the rotor longitudinally in the direction of the central axis.

12. The nuclear reactor according to claim 1, wherein the driving device comprises a rod extending parallel to the central axis, the movement part making up a lower segment of the rod.

13. The nuclear reactor according to claim 1, wherein a top part of the driven member has a polygonal outer shape.

14. The nuclear reactor according to claim 13, wherein the top part of the driven member forms a polyhedral ring.

15. The nuclear reactor according to claim 13, wherein the top part includes a shoulder configured for being held by the release system.

16. The nuclear reactor according to claim 13, wherein below the top part of the driven member, the drive member has a circular outer shape.

17. The nuclear reactor according to claim 1, wherein the orifice has a circular section below the polygonal section of orifice.

18. The nuclear reactor according to claim 1, wherein a portion of the polygonal section of the movement part of the driving device is received in polygonal section of a top part of the driven member to define the polygonal section of orifice.

19. The nuclear reactor according to claim 18, wherein a portion of the polygonal section of the movement part of the driving device is received in a circular section of the driven member to define the circular section of orifice.

20. The nuclear reactor according to claim 1, wherein the orifice extends an entire height of the driven member.

\* \* \* \* \*